United States Patent
Takahashi (10) Patent No.: US 10,851,709 B2
(45) Date of Patent: Dec. 1, 2020

(54) INTERNAL COMBUSTION ENGINE CONTROL METHOD AND CONTROL DEVICE

(71) Applicant: Nissan Motor Co., Ltd., Kanagawa (JP)

(72) Inventor: Eiji Takahashi, Kanagawa (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 16/469,398

(22) PCT Filed: Dec. 13, 2016

(86) PCT No.: PCT/JP2016/086981
§ 371 (c)(1),
(2) Date: Jun. 13, 2019

(87) PCT Pub. No.: WO2018/109819
PCT Pub. Date: Jun. 21, 2018

(65) Prior Publication Data
US 2020/0095927 A1    Mar. 26, 2020

(51) Int. Cl.
*F02D 15/02* (2006.01)
*F02B 75/04* (2006.01)

(52) U.S. Cl.
CPC ............ *F02B 75/047* (2013.01); *F02D 15/02* (2013.01)

(58) Field of Classification Search
CPC .... F02D 15/02; F02D 2700/03; F02B 75/048; F02B 75/04; F02B 75/047
See application file for complete search history.

(56) References Cited

U.S. PATENT DOCUMENTS

| | | | | |
|---|---|---|---|---|
| 2007/0089697 A1* | 4/2007 | Hara | ................. | F02D 41/0002 123/90.15 |
| 2011/0005496 A1* | 1/2011 | Hiraya | ................. | F02D 41/10 123/48 B |
| 2013/0327302 A1* | 12/2013 | Hiyoshi | ................. | F02B 75/048 123/48 R |

(Continued)

FOREIGN PATENT DOCUMENTS

| | | |
|---|---|---|
| EP | 1918553 A2 | 5/2008 |
| EP | 2775122 A1 | 9/2014 |

(Continued)

*Primary Examiner* — Long T Tran
(74) *Attorney, Agent, or Firm* — Osha Bergman Watanabe & Burton LLP (57) ABSTRACT

A control method for an internal combustion engine is arranged to vary an engine compression ratio, and includes a control mechanism arranged to control the engine compression ratio, and a driving source arranged to drive the control mechanism. The control method includes converting an operation amount of the driving source in accordance with an attenuation rate according to the engine compression ratio, transmitting the converted operation amount to the control mechanism, and controlling the cylinder pressure based on a basic ignition timing when the attenuation rate is relatively large, and controlling the cylinder pressure based on an allowable ignition timing retarded from the basic ignition timing when the attenuation rate is relatively small.

8 Claims, 6 Drawing Sheets

(56) References Cited

U.S. PATENT DOCUMENTS

2015/0219024 A1* 8/2015 Kurashima ......... F02D 13/0234
                                                      123/321
2015/0361904 A1* 12/2015 Mano ...................... F02D 41/22
                                                      123/48 A
2016/0102629 A1* 4/2016 Quix ....................... F01B 31/14
                                                      123/298

FOREIGN PATENT DOCUMENTS

| JP | S61-187561 A | 8/1986 |
| JP | 2009-185629 A | 8/2009 |
| JP | 2012-21414 A | 2/2012 |
| JP | 2013-253512 A | 12/2013 |

* cited by examiner

INTERNAL COMBUSTION ENGINE CONTROL METHOD AND CONTROL DEVICE

BACKGROUND

Technical Field

This invention relates to a control of an internal combustion engine provided with a variable compression ratio mechanism arranged to vary an engine compression ratio.

Related Art

Conventionally, there is known a variable compression ratio internal combustion engine provided with a variable compression ratio mechanism arranged to vary an engine compression ratio of the internal combustion engine in accordance with a rotation position of a control shaft. Moreover, a patent document 1 discloses an art to control an ignition timing so that a cylinder pressure which is a pressure within a combustion chamber of the internal combustion engine does not exceed a predetermined cylinder pressure.

Patent Document 1: Japanese Patent Application Publication No. 2012-21414

SUMMARY

For example, the variable compression ratio internal combustion engine includes a link mechanism connecting a rotation shaft driven by an actuator which is a driving source, and a control shaft of the variable compression ratio mechanism. The variable compression ratio internal combustion engine is arranged to transmit a driving force of the actuator through the rotation shaft and the link mechanism to the control shaft so as to rotate the control shaft, and thereby to vary an engine compression ratio. In this variable compression ratio internal combustion engine, a posture of the link mechanism is varied in accordance with the rotation position of the control shaft. Accordingly, a reduction ratio (attenuation rate) which is a ratio (a rotation amount of the rotation shaft/a rotation amount of the control shaft) between the rotation amount of the control shaft and the rotation amount of the rotation shaft arranged to be driven by an actuator which is a driving source is also varied in accordance with the rotation position of the control shaft, that is, the engine compression ratio.

The configuration is not limited to the above-described configuration. The internal combustion engine arranged to vary the engine compression ratio includes a control mechanism arranged to control the engine compression ratio, and the driving source arranged to drive this control mechanism. In a mechanism arranged to convert an operation amount of the driving source in accordance with the attenuation rate according to the engine compression ratio, and to transmit the converted operation amount to the control mechanism, the attenuation rate is varied in accordance with the engine compression ratio.

By the way, the cylinder pressure which is the pressure within the combustion chamber of the internal combustion chamber is increased by the combustion. This cylinder pressure is acted to the actuator through the control shaft, the link mechanism, and the rotation shaft. Accordingly, the actuator needs a holding torque for holding the control shaft to a predetermined rotation position against the cylinder pressure. Moreover, the cylinder pressure is previously restricted to be equal to or smaller than a predetermined allowable cylinder pressure when the internal combustion engine is designed for protecting components and so on. For example, the ignition timing control is performed in a range in which the cylinder pressure is equal to or smaller than the allowable cylinder pressure.

In this case, the driving torque acted from the actuator through the link mechanism to the control shaft is amplified as the reduction ratio (the attenuation rate) becomes greater. On the other hand, the torque acted to the actuator side due to the cylinder pressure is attenuated as the reduction ratio becomes greater. Conversely, the torque acted to the actuator side due to the cylinder pressure becomes relatively large as the reduction ratio becomes smaller. Accordingly, when the allowable cylinder pressure is set without considering the reduction ratio of the link mechanism, for example, the link mechanism and the actuator are designed in accordance with the large input load when the reduction ratio is small. Consequently, the weight increase and the size increase of the link mechanism and the actuator are caused. Moreover, in a case where the allowable cylinder pressure is maintained to the large value irrespective that the torque acted to the actuator side due to the cylinder pressure becomes small when the reduction ratio is large, the cylinder pressure is unnecessarily restricted.

One or more embodiments of the present invention appropriately sets an allowable cylinder pressure in accordance with the reduction ratio (attenuation rate) varying in accordance with variation of an engine compression ratio, and suppresses a weight increase and a size increase of a link mechanism (control mechanism) and an actuator (driving source).

A control method for an internal combustion engine which is arranged to vary an engine compression ratio, and which includes a control mechanism arranged to control the engine compression ratio, and a driving source arranged to drive the control mechanism, the control method comprises: converting an operation amount of the driving source in accordance with an attenuation rate according to the engine compression ratio; transmitting the converted operation amount to the control mechanism; and controlling the cylinder pressure based on a basic ignition timing when the attenuation rate is relatively large, and controlling the cylinder pressure based on an allowable ignition timing retarded from the basic ignition timing when the attenuation rate is relatively small.

According to one or more embodiments of the present invention, it may be possible to appropriately set the allowable cylinder pressure in accordance with the attenuation rate (the reduction ratio) varying in accordance with the variation of the engine compression ratio, and to suppress the weight increase and the size increase of the control mechanism (the link mechanism) and the driving source (the actuator).

BRIEF DESCRIPTION OF DRAWINGS

FIG. 9(A) shows the case where the ignition timing control is not performed. FIG. 9(B) shows the case where the ignition timing control is performed.

DETAILED DESCRIPTION

Hereinafter, embodiments of the present invention are explained in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Firstly, a variable compression ratio mechanism using a multi-link piston crank mechanism according to one or more embodiments of the present invention is explained. Besides, this mechanism is known as described in Japanese Patent Application Publication No. 2009-185629, which is hereby incorporated by reference in its entirety, and so on. Accordingly, this mechanism is briefly explained.

Figure 1:
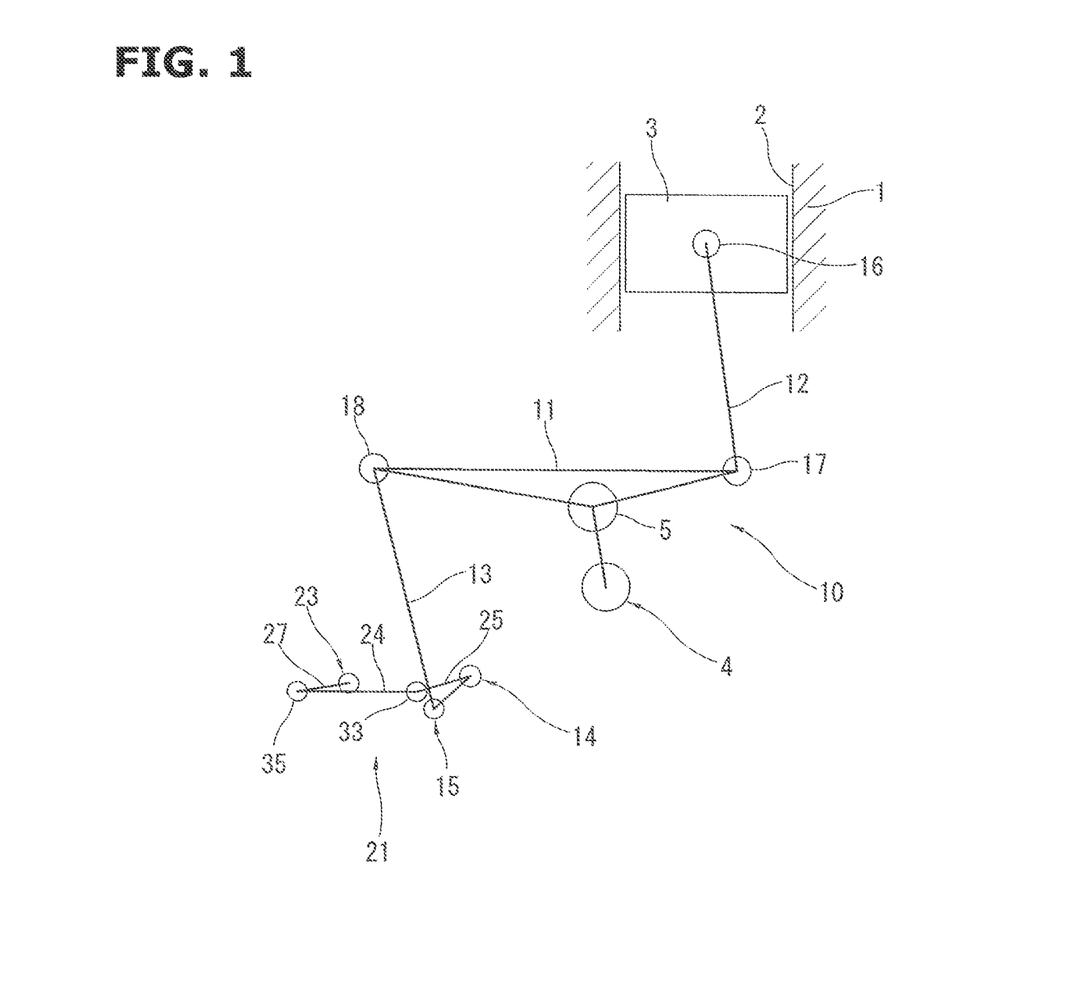
FIG. 1 is a schematic configuration view showing a variable compression ratio mechanism according to one or more embodiments of the present invention.

A cylinder block 1 constitutes a portion of an engine main body of an internal combustion engine. In the cylinder block 1, a piston 3 is slidably mounted in each cylinder 2. Moreover, a crank shaft 4 is rotatably supported by the cylinder block 1. A variable compression ratio mechanism 10 includes a lower link 11 rotatably mounted on a crank pin 5 of the crank shaft 4; an upper link 12 connecting this lower link 11 and the piston 3; a control shaft 14 rotatably supported by an engine main body side of the cylinder block 1 and so on; a control eccentric shaft portion 15 eccentrically provided to this control shaft 14; and a control link 13 connecting this control eccentric shaft portion 15 and the lower link 11. The piston 3 and an upper end of the upper link 12 are rotatably connected to each other through a piston pin 16. A lower end of the upper link 12 and the lower link 11 are rotatably connected to each other through a first link pin 17. An upper end of the control link 13 and the lower link 11 are connected to each other through a second link pin 18. A lower end of the control link 13 is rotatably mounted to the control eccentric shaft portion 15.

The control shaft 14 is connected through a link mechanism 21 (described later) to a drive motor 20 (cf. FIG. 2 and so on) which is an actuator. This drive motor 20 varies and/or holds the rotation position of the control shaft 14. With this, a posture of the lower link 11 is varied to vary a piston stroke characteristic including a piston upper dead center position and a piston lower dead position, so that the engine compression ratio is varied. Accordingly, it is possible to control the engine compression ratio in accordance with the engine driving state by drivingly controlling the drive motor 20 by a control section 40.

An upper oil pan is fixed to a lower portion of the cylinder block 1 which is the engine main body. A housing 22 receiving the drive motor 20, and the drive motor 20 are disposed on a side wall (intake-side side wall) 7 of the upper oil pan 6A on the intake side, along the forward and rearward directions of the vehicle.

Figure 2:
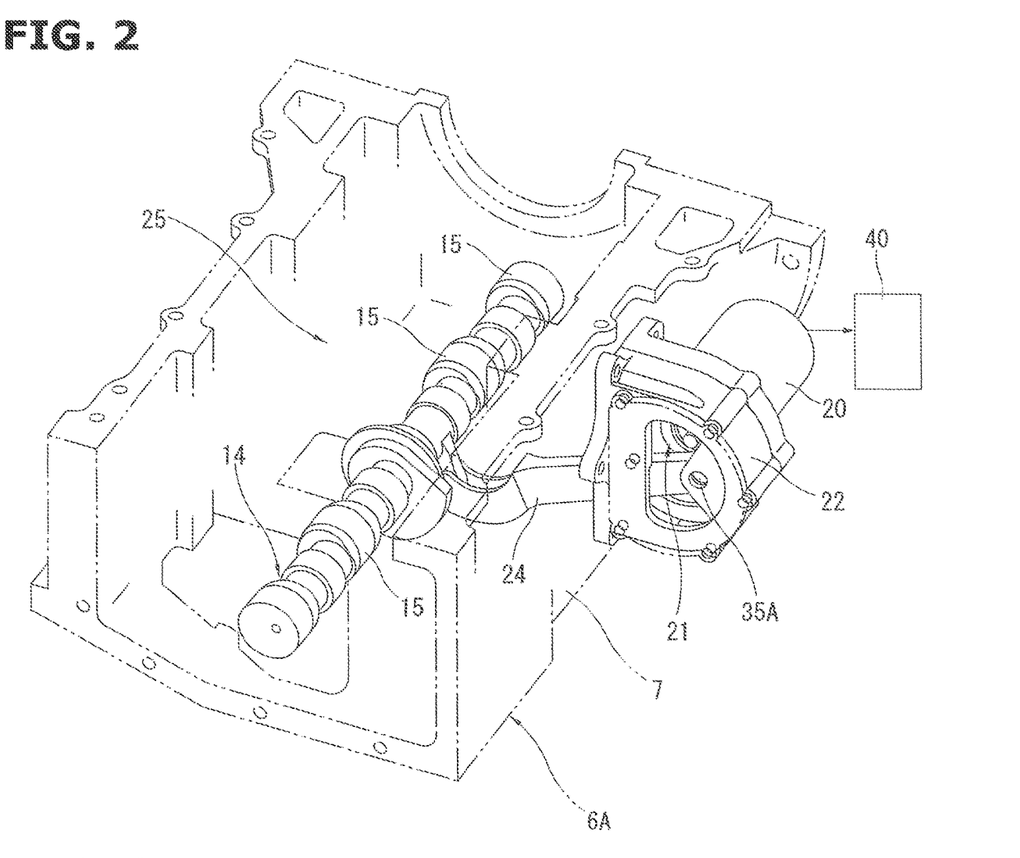
FIG. 2 is a perspective view showing a portion of an internal combustion engine provided with the variable compression ratio mechanism according to one or more embodiments of the present invention.

As shown in FIG. 1 and FIG. 2, the control shaft 14 is received within the engine main body of the cylinder block and so on. The rotation shaft 23 is disposed within the housing 22. The rotation shaft 23 is driven and rotated by the driving motor 20. The control shaft 14 and the rotation shaft 23 are mechanically connected with each other by the link mechanism 21. Besides, according to one or more embodiments of the present invention, the rotation shaft 23 is integrally constituted with the output shaft of a speed reducer (not shown). However, this is merely one example. For example, the rotation shaft 23 and the output shaft of the speed reducer may be difference members. These rotation shaft 23 and output shaft may be arranged to be rotate as a unit.

The link mechanism 21 includes a lever 24. One end of this lever 24 and a tip end of a first arm portion 25 extending from the center of the control shaft 14 in the radially outward direction are rotatably connected with each other through a third link pin 33. One end of a second arm portion 27 extending from the center of the rotation shaft 23 in the radially outward direction, and the other end of the lever 24 are rotatably connected with each other through a fourth link pin 35. Besides, in FIG. 2, the fourth link pin 35 is omitted. A pin link hole 35A of the rotation shaft 23 in which this fourth link pin 35 is mounted is shown. A slit-shaped connection hole (not shown) through which the lever 24 is inserted is formed in the side wall 7 of the upper oil pan 6A on the intake side, so as to penetrate through the side wall 7.

Moreover, the speed reducer is provided within the housing 22. The speed reducer is arranged to reduce the speed of the output of the drive motor 20, and to transmit the speed-reduced output to the control shaft 14 side. The speed reducer is a wave gear device, a cycloidal speed reducer, and so on by which it is possible to obtain a large reduction ratio. Furthermore, a reduction ratio (attenuation ratio) of the link mechanism 21 mechanically connecting the rotation shaft 23 and the control shaft 14 is varied in accordance with the rotation position of the control shaft 14. That is, the control shaft 14 is rotated so as to vary the engine compression ratio. Moreover, the postures of the first arm portion 25, the second arm portion 27, and the lever 24 are varied. Consequently, the reduction ratio (the rotation amount of the rotation shaft 23/the rotation amount of the control shaft 14) which is a ratio between the rotation amount of the rotation shaft 23 positioned on the drive motor 20 side, and the rotation amount of the control shaft 14 is varied. Besides, an arm length of the first arm portion 25 is set to be longer than the second arm portion 27 so as to obtain some reduction ratio. The arm length of the first arm portion 25 is set to be twice as long as that of the second arm portion 27.

Besides, the control shaft 14, the rotation shaft 23, the link mechanism 21, and so on constitute a control mechanism arranged to control the engine compression ratio.

Figure 3:
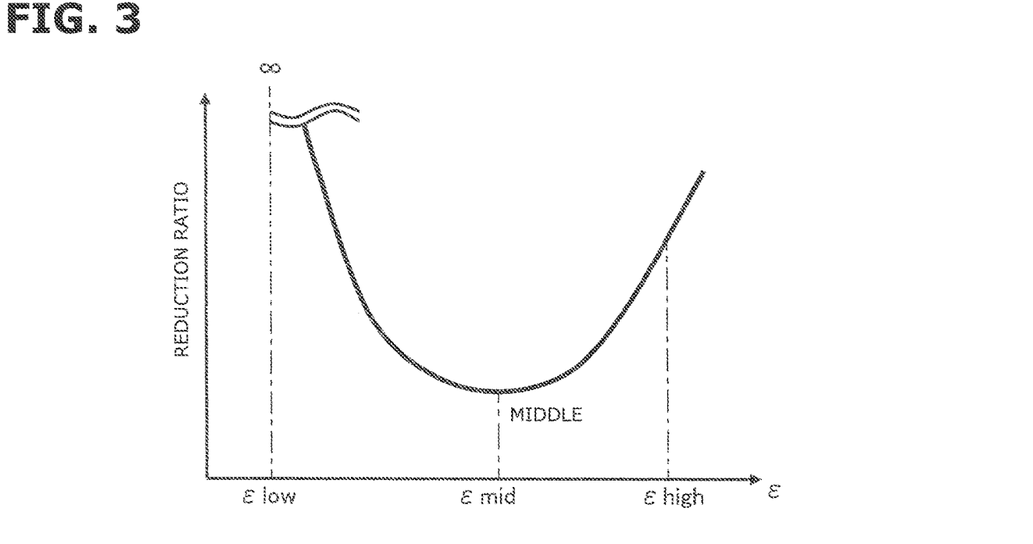
FIG. 3 is a characteristic view showing a relationship between an engine compression ratio and a reduction ratio of a link mechanism.

FIG. 3 shows a relationship between the engine compression ratio and the reduction ratio. In the link layout according to one or more embodiments of the present invention, the reduction ratio becomes smallest in the link posture at a predetermined middle compression ratio εmid. The reduction ratio becomes greater as the engine compression ratio becomes higher from the middle compression ratio εmid. Moreover, the reduction ratio becomes greater as the engine compression ratio becomes lower from the middle compression ratio εmid. Furthermore, the reduction ratio becomes greatest at the minimum compression ratio εlow.

Figure 4:
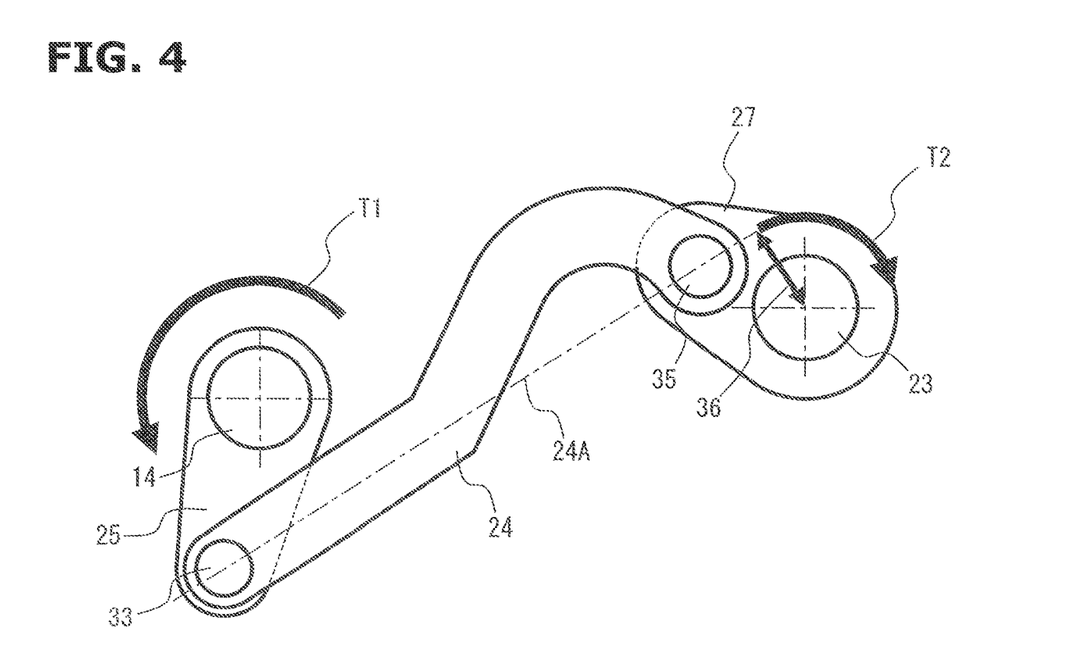
FIG. 4 is an explanation view showing a posture of the link mechanism in a setting state of a high compression ratio.
Figure 5:
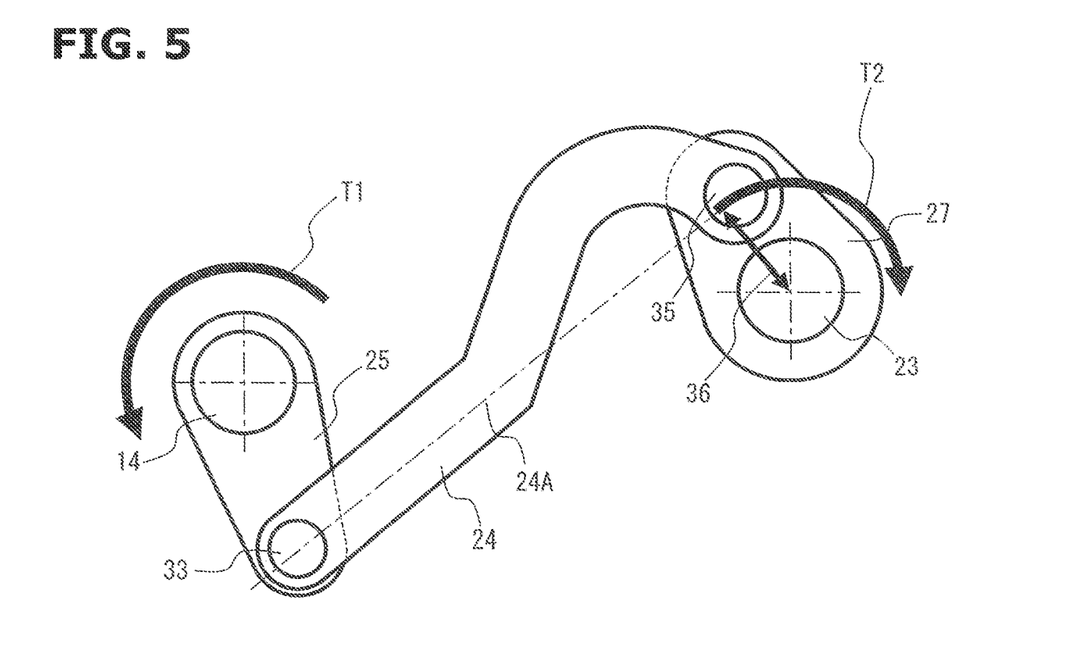
FIG. 5 is an explanation view showing a posture of the link mechanism in a setting state of a middle compression ratio.
Figure 6:
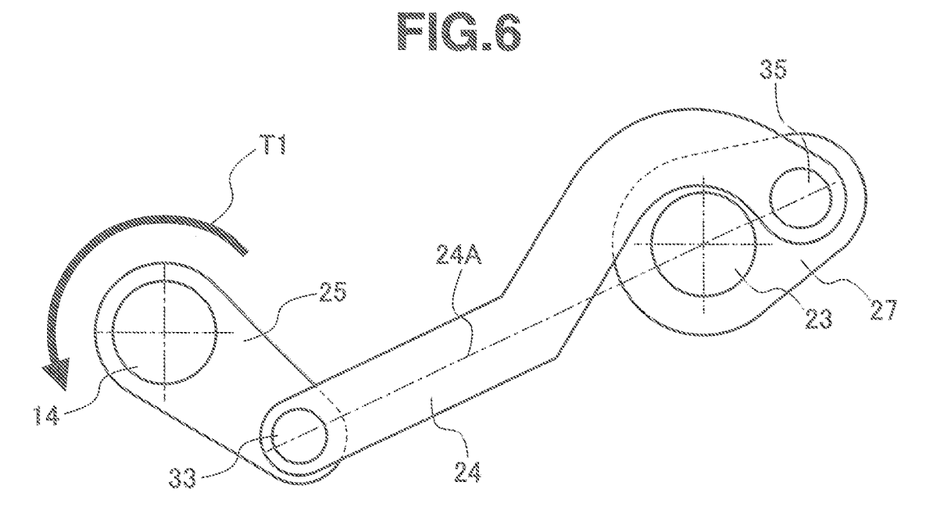
FIG. 6 is an explanation view showing a posture of the link mechanism in a setting state of a low compression ratio.

FIG. 4 to FIG. 6 show concrete link postures at the maximum compression ratio εhigh, the middle compression ratio εmid, and the minimum compression ratio εlow.

In the posture at the maximum compression ratio εhigh as shown in FIG. 4, the load of the cylinder pressure generates torque T1 in a direction (in a counterclockwise direction in FIG. 4) to rotate the control shaft 14 to the low compression ratio posture side through the piston 3, the upper link 12, the lower link 11, and the control link 13, and generates torque T2 in clockwise direction to the rotation shaft 23 through the lever 24.

In the posture at the middle compression ratio εmid at which the reduction ratio becomes smallest as shown in FIG. 5, a moment arm 36 which is a shortest distance between an extension line of a link center line 24A of the lever 24 (a line connecting the third link pin 33 and the fourth link pin 35), and the center of the rotation shaft 23 becomes maximum vicinity. That is, the moment arm 36 when the torque T2 is transmitted from the lever 24 to the rotation shaft 23 is largely ensured. This is a posture in which the torque T2 generated in the rotation shaft 23 due to the cylinder pressure becomes large. Moreover, in a viewpoint of the control shaft 14 driven from the drive motor 20 side through the rotation shaft 23, the amplification of the drive torque is suppressed to the low value for the posture by which the reduction ratio is small. However, the variation amount of the engine compression ratio with respect to the drive amount becomes large, so that the response of the variation of the engine compression ratio is improved.

In the posture of the minimum compression ratio εlow as shown in FIG. 6, the moment arm 36 when the lever 24 transmits the load to the rotation shaft 23 becomes substantially zero. That is, the posture at the minimum compression ratio εlow is the posture by which the torque (T2) acted to the rotation shaft 23 due to the cylinder pressure is substantially zero. Moreover, in a viewpoint of the control shaft 14 driven from the rotation shaft 23 side, the driving torque is maximally amplified for the posture by which the reduction ratio is large. Consequently, the driving torque is amplified by increasing the reduction ratio of the link mechanism 21, at the low compression ratio which is mainly used in the high rotation speed high load region. With this, it is possible to decrease the driving torque, to attain the size reduction of the driving motor 20 (the actuator), and to decrease the energy consumption.

Figure 7:
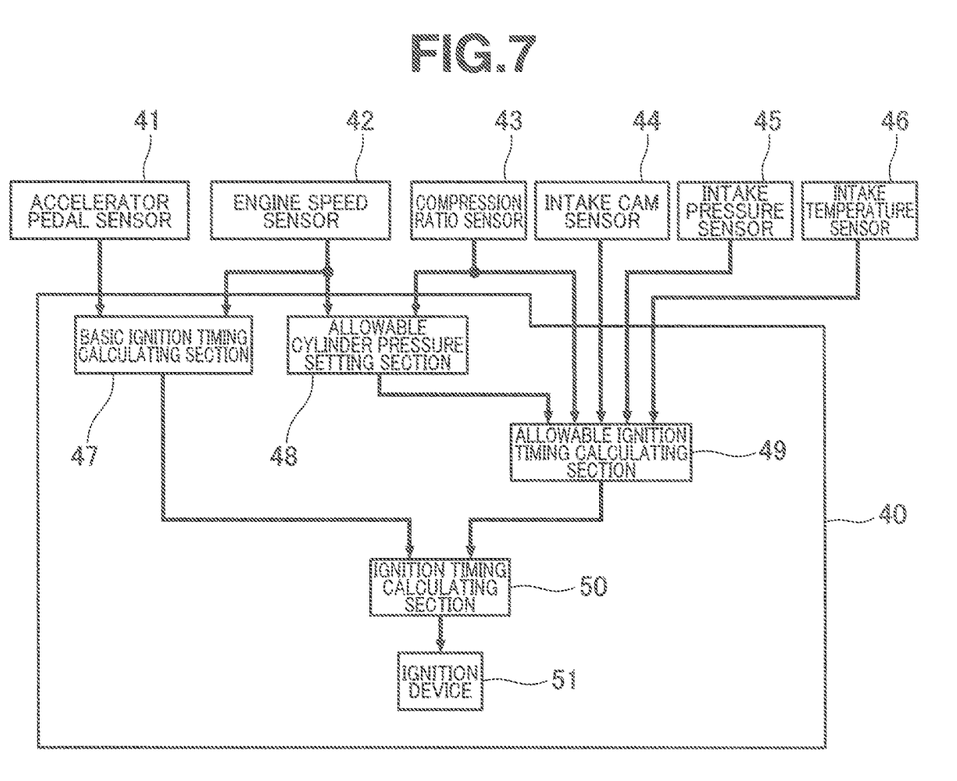
FIG. 7 is a control block diagram according to one or more embodiments of the present invention.
Figure 8:
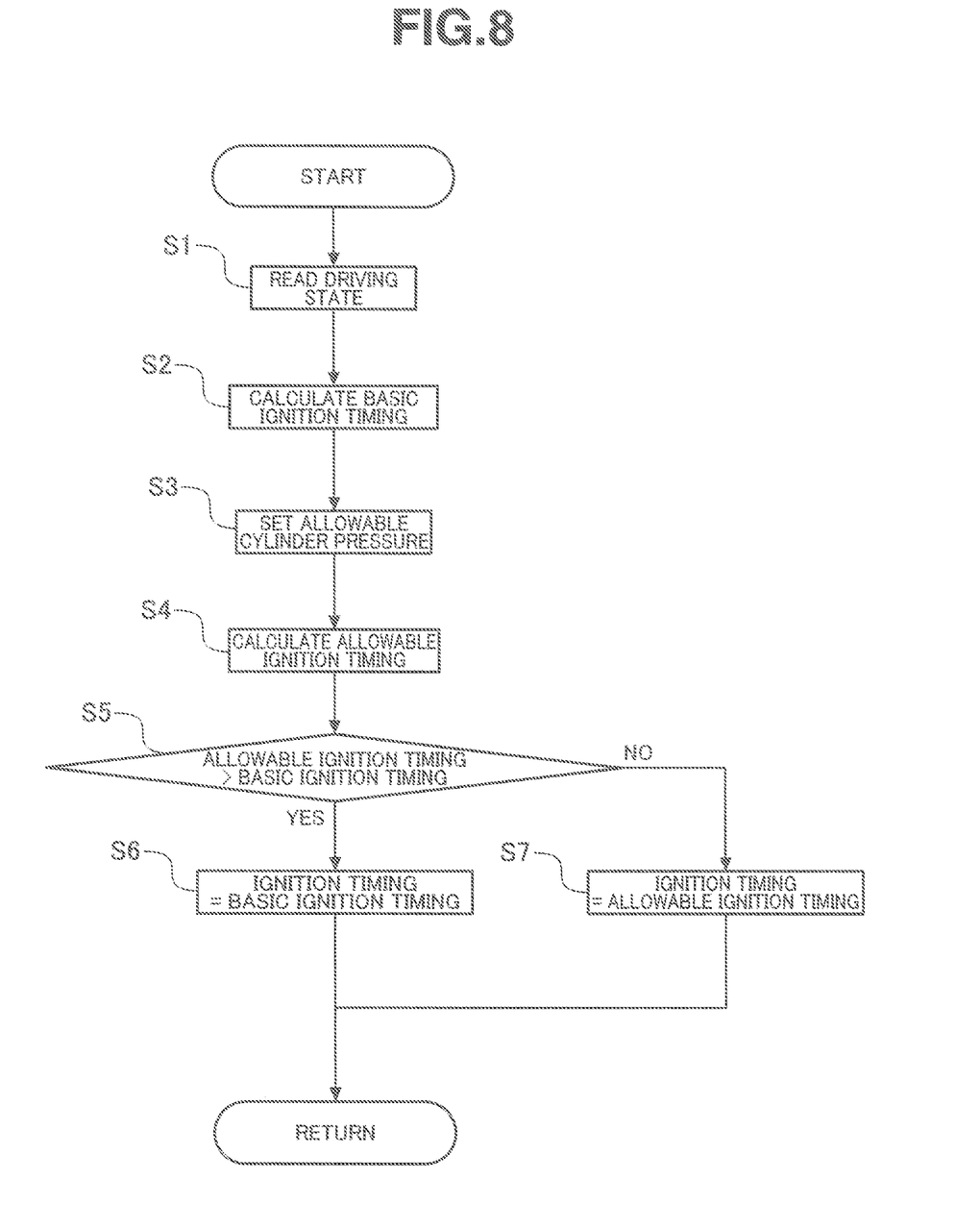
FIG. 8 is a flowchart showing a flow of a control according to one or more embodiments of the present invention.

FIG. 7 is a control block diagram according to one or more embodiments of the present invention. FIG. 8 is a flowchart showing a flow of the control according to one or more embodiments of the present invention. This routine is repeatedly performed at each predetermined period (for example, at each 10 ms) by the control section 40 which is an ignition timing control section.

At step S1, output signals from various sensors which are arranged to sense the engine driving state, and which include an accelerator pedal sensor 41 arranged to sense an accelerator pedal operation amount, an engine speed sensor 42 arranged to sense the engine speed, a compression ratio sensor 43 arranged to sense the engine compression ratio, an intake cam sensor 44 arranged to sense a rotation phase of an intake cam shaft, an intake pressure sensor 45 arranged to sense an intake pressure, an intake temperature sensor 46 arranged to sense an intake temperature, and so on are read. Subsequently to step S1, the process proceeds to step S2.

At step S2, a basic ignition timing calculating section 47 calculates a basic ignition timing based on the engine speed and the accelerator pedal operation amount. Subsequently to step S2, the process proceeds to step S3. The basic ignition timing is previously obtained, for example, by experiment or calculation. The basic ignition timing is stored as a map having parameters of the engine speed and the accelerator pedal amount.

At step S3, an allowable cylinder pressure setting section 48 calculates a maximum allowable cylinder pressure Pmax which is allowed as the cylinder pressure within the combustion chamber of the internal combustion engine, based on the engine speed and the engine compression ratio. Subsequently to step S3, the process proceeds to step S4. The allowable cylinder pressure may be previously stored as a map, and determined with reference to the map based on the engine speed and the engine compression ratio. Alternatively, the allowable cylinder pressure may be successively calculated from the reduction ratio (the compression ratio) and the inertia force (the engine speed).

At step S4, an allowable ignition timing calculating section 49 calculates an allowable ignition timing which is an allowable advance amount (allowable advance angle amount) that is a limit of the ignition timing, based on the allowable cylinder pressure, the engine compression ratio, the intake valve closing timing, the intake pressure, and the intake temperature, so that an actual cylinder pressure is equal to or smaller than the allowable cylinder pressure. Subsequently to step S4, the process proceeds to step S5. The allowable ignition timing is stored as a function of these parameters.

At step S5, the allowable ignition timing and the basic ignition timing are compared. When the basic ignition timing is the retard side (retard angle side), the process proceeds to step S6. When the basic ignition timing is not the retard side, the process proceeds to step S7. At step S6, the ignition timing is set to the basic ignition timing. At step S7, the ignition timing is set to the allowable ignition timing. The signal of that ignition timing is outputted to an ignition device (ignition plug) 51.

Figure 9A:
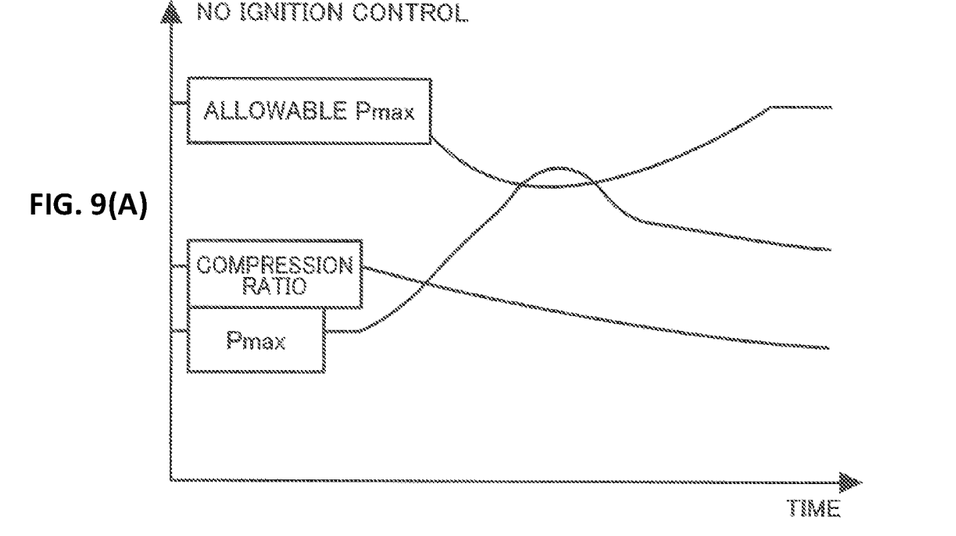
FIGS. 9(A) and 9(B) are explanation views showing a difference between a case where an ignition timing control according to one or more embodiments of the present invention is performed, and a case where the ignition timing control is not performed.
Figure 9B:
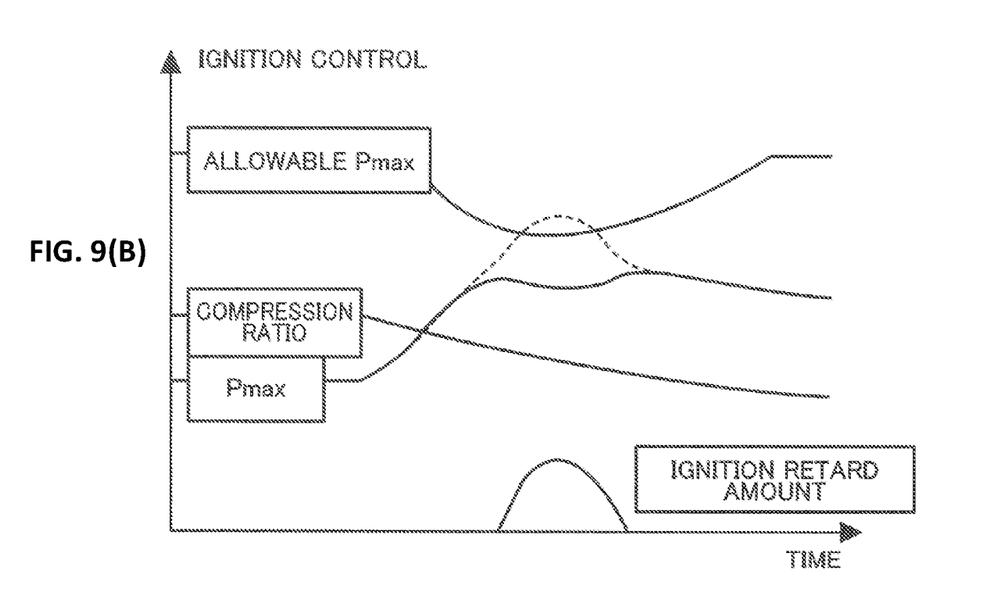

FIGS. 9(A)-9(B) are timing charts showing variations of the allowable cylinder pressure, the engine compression ratio, and the cylinder pressure. FIG. 9(A) shows characteristics of a comparative example in which the ignition timing control according to the allowable cylinder pressure as shown in FIG. 8 is not performed. FIG. 9(B) shows characteristics of one or more embodiments of the present invention in which the ignition timing control according to the allowable cylinder pressure as shown in FIG. 8 is performed. In the drawings, "allowable Pmax" represents the allowable cylinder pressure. "Pmax" represents (the maximum value of) the actual cylinder pressure. When the allowable cylinder pressure is varied in accordance with the engine compression ratio (the reduction ratio of the link mechanism 21), the allowable cylinder pressure becomes low at the middle compression ratio εmid. Accordingly, the actual cylinder pressure may exceed the allowable cylinder pressure, as shown in FIG. 9(A). However, according to one or more embodiments of the present invention, in a case where the allowable cylinder pressure is small, the ignition timing is retarded, as shown in FIG. 9(B). Accordingly, it is possible to avoid the actual cylinder pressure from exceeding the allowable cylinder pressure.

Characteristic configurations, operations, and effects in one or more of the above-described embodiments are explained below.

In the configuration in which the reduction ratio of the link mechanism 21 is varied in accordance with the engine compression ratio like in one or more embodiments of the present invention, the load generated in the control shaft 14 due to the cylinder pressure is also varied. Accordingly, the allowable cylinder pressure is not constant. The allowable cylinder pressure is varied in accordance with the engine compression ratio (the reduction ratio of the link mechanism 21).

Accordingly, in a case where the allowable cylinder pressure is set to the constant value without considering (independently of) the reduction ratio of the link mechanism 21, it is necessary to form the link mechanism 21 having the unnecessary strength. In one or more embodiments of the present invention, the allowable cylinder pressure at the engine compression ratio at which the reduction ratio becomes small is set to be smaller than the allowable cylinder pressure at the engine compression ratio at which the reduction ratio becomes large. Consequently, it is not necessary to form the link mechanism 21 having unnecessary strength, relative to a case where the same allowable cylinder pressure is constantly maintained. Therefore, it is possible to attain the weight reduction and the size reduction of the device.

Roughly speaking, the cylinder pressure becomes greater value as the engine load becomes higher. Accordingly, the reduction ratio is set to the large reduction ratio at the low compression ratio used when the engine load is high. With this, according to one or more embodiments of the present invention, the input to the actuator (the driving motor 20) side due to the cylinder pressure is suppressed. On the other hand, the variation amount of the engine compression ratio with respect to the driving amount of the drive motor 20 becomes larger as the reduction ratio becomes smaller. The variation speed of the engine compression ratio, that is, the response becomes high. In one or more embodiments of the present invention, the reduction ratio at the middle compression ratio is set to be smaller than those at the high compression ratio and at the low compression ratio. With this, it is possible to resist the high cylinder pressure by increasing the reduction ratio, in the setting of the low compression ratio used in the high load, and to improve the response by decreasing the reduction ratio at the middle compression ratio. With this, it is possible to shorten the time period at the switching between the high compression ratio and the low compression ratio.

The load due to the inertia of the piston and link members is acted to the drive motor 20 side which is the actuator, in addition to the load due to the cylinder pressure. Accordingly, in one or more embodiments of the present invention, the allowable cylinder pressure is set in consideration of the engine speed, in addition to the reduction ratio. Specifically, the load due to the inertia becomes larger as the engine speed becomes higher. Consequently, the allowable cylinder pressure is set to the smaller value as the engine speed becomes higher. In this way, the allowable cylinder pressure is appropriately set in accordance with the engine speed. With this, it is not necessary to form the link mechanism having the unnecessary large strength, relative to a case where the allowable cylinder pressure is determined by supposing the maximum inertia, that is, the inertia at the highest rotation speed. With this, it is possible to attain the weight reduction and the size reduction of the actuator (the drive motor 20).

The thus-set allowable cylinder pressure is used, for example, for the ignition timing control. Specifically, the ignition timing is controlled so that the actual cylinder pressure is within the allowable cylinder pressure. In this way, the allowable cylinder pressure is reflected to the ignition timing control having good response. With this, it is possible to suppress the cylinder pressure to be equal to or smaller than the allowable cylinder pressure, irrespective of the variation of the engine speed and the engine compression ratio.

Moreover, the retard amount of the ignition timing is calculated based on the engine compression ratio, the allowable cylinder pressure, the intake pressure, the intake temperature, the intake valve closing timing and so on when the variable valve actuating mechanism is provided on the intake side. With this, it is not necessary to ensure a margin for the retard amount of the ignition timing in consideration of the variations of the engine compression ratio, the intake pressure, the intake temperature, and the intake valve closing timing.

The present invention is explained based on embodiments, as described above. However, the present invention is not limited to the above-described embodiments. Various variations are included in the present invention. For example, in one or more of the above-described embodiments, the protruding direction of the first arm portion 25 and the protruding direction of the second arm portion 27 are the same direction with respect to the line passing through the center of the control shaft 14 and the center of the rotation shaft 23. However, these protruding directions may be opposite directions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A control method for an internal combustion engine which is arranged to vary an engine compression ratio, and which includes a control mechanism arranged to control the engine compression ratio, and a driving source arranged to drive the control mechanism, the control method comprising:
   converting an operation amount of the driving source in accordance with a reduction ratio according to the engine compression ratio;
   transmitting the converted operation amount to the control mechanism; and
   setting the reduction ratio at a predetermined middle compression ratio, wherein the middle reduction ratio is smaller than a high reduction ratio at a high compression ratio higher than the middle compression ratio, and is smaller than a low reduction ratio at a low compression ratio lower than the middle compression ratio; and
   controlling a cylinder pressure based on a basic ignition timing when the reduction ratio is larger than the middle reduction ratio, and controlling the cylinder pressure based on an allowable ignition timing retarded from the basic ignition timing at the middle reduction ratio.

2. The control method for the internal combustion engine as claimed in claim 1, wherein an allowable cylinder pressure which is a limit pressure allowed within the combustion chamber of the internal combustion engine is varied in accordance with an engine speed.

3. The control method for the internal combustion engine as claimed in claim 1, wherein an ignition timing is controlled so that a cylinder pressure within the combustion chamber becomes equal to or smaller than an allowable cylinder pressure which is a limit pressure allowed within the combustion chamber of the internal combustion engine.

4. A control method for an internal combustion engine which is arranged to vary an engine compression ratio, and which includes a control mechanism arranged to control the engine compression ratio, and a driving source arranged to drive the control mechanism, the control method comprising:
  converting an operation amount of the driving source in accordance with a reduction ratio according to the engine compression ratio;
  transmitting the converted operation amount to the control mechanism; and
  controlling a cylinder pressure based on a basic ignition timing when the reduction ratio is larger than a middle reduction ratio at a predetermined middle compression ratio, and controlling the cylinder pressure based on an allowable ignition timing retarded from the basic ignition timing at the middle reduction ratio,
  wherein an ignition timing is controlled so that the cylinder pressure within the combustion chamber becomes equal to or smaller than an allowable cylinder pressure which is a limit pressure allowed within the combustion chamber of the internal combustion engine, and
  wherein an allowable advance amount of the ignition timing is calculated based on at least an engine speed and the allowable cylinder pressure.

5. A control device for an internal combustion engine including a variable compression ratio mechanism arranged to vary an engine compression ratio in accordance with a rotation position of a control shaft, an actuator arranged to drive and rotate a rotation shaft, and a link mechanism mechanically connecting the control shaft and the rotation shaft, the link mechanism arranged to vary a reduction ratio which is a ratio between a rotation amount of the rotation shaft, and a rotation amount of the control shaft in accordance with the rotation position of the control shaft, the control device comprising:
  a control section configured to control a cylinder pressure based on a basic ignition timing when the reduction ratio is larger than a middle reduction ratio at a predetermined middle compression ratio, and to control the cylinder pressure based on an allowable ignition timing retarded from the basic ignition timing at the middle reduction ratio,
  wherein the link mechanism is set so that the middle reduction ratio at the predetermined middle compression ratio is set to be smaller than a high reduction ratio at a high compression ratio higher than the middle compression ratio, and is smaller than a low reduction ratio at a low compression ratio lower than the middle compression ratio.

6. The control device for the internal combustion engine as claimed in claim 5,
  wherein the control section further comprises an allowable cylinder pressure setting section configured to set an allowable cylinder pressure which is a limit pressure allowed in a combustion chamber of the internal combustion engine, and
  wherein the allowable cylinder pressure setting section is configured to vary the allowable cylinder pressure in accordance with an engine speed.

7. The control device for the internal combustion engine as claimed in claim 5,
  wherein the control section comprises an allowable cylinder pressure setting section configured to set an allowable cylinder pressure which is a limit pressure allowed in a combustion chamber of the internal combustion engine, and
  the control section is configured to control the ignition timing so that a cylinder pressure within the combustion chamber becomes equal to or smaller than the allowable cylinder pressure.

8. A control device for an internal combustion engine including a variable compression ratio mechanism arranged to vary an engine compression ratio in accordance with a rotation position of a control shaft, an actuator arranged to drive and rotate a rotation shaft, and a link mechanism mechanically connecting the control shaft and the rotation shaft, the link mechanism arranged to vary a reduction ratio which is a ratio between a rotation amount of the rotation shaft, and a rotation amount of the control shaft in accordance with the rotation position of the control shaft, the control device comprising:
  a control section configured to control a cylinder pressure based on a basic ignition timing when the reduction ratio is larger than a middle reduction ratio at a predetermined middle compression ratio, and to control the cylinder pressure based on an allowable ignition timing retarded from the basic ignition timing at the middle reduction ratio,
  wherein the control section comprises an allowable cylinder pressure setting section configured to set an allowable cylinder pressure which is a limit pressure allowed in a combustion chamber of the internal combustion engine, and
  the control section is configured to control the ignition timing so that a cylinder pressure within the combustion chamber becomes equal to or smaller than the allowable cylinder pressure,
  wherein the control section is configured to calculate an allowable advance amount of the ignition timing based on at least an engine speed and the allowable cylinder pressure.

* * * * *